United States Patent
Lane et al.

(10) Patent No.: US 7,076,056 B1
(45) Date of Patent: Jul. 11, 2006

(54) METHODS AND APPARATUS FOR A BRIDGE TAP MODERATOR

(75) Inventors: Michael F. Lane, Mashpee, MA (US); Mehmet Mustafa, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 157 days.

(21) Appl. No.: 10/337,144

(22) Filed: Jan. 6, 2003

Related U.S. Application Data

(60) Provisional application No. 60/346,450, filed on Jan. 7, 2002.

(51) Int. Cl.
*H04M 9/00* (2006.01)
*H04M 1/00* (2006.01)

(52) U.S. Cl. .......................... 379/413.03; 379/399.01; 379/400; 379/403

(58) Field of Classification Search ............... 379/345, 379/394, 398, 399, 399.01, 400, 403, 413.02, 379/413.03
See application file for complete search history.

(56) References Cited

U.S. PATENT DOCUMENTS

| | | | | |
|---|---|---|---|---|
| 4,533,201 A * | 8/1985 | Wasserlein, Jr. | ............ | 439/404 |
| 5,272,277 A * | 12/1993 | Humbles et al. | ............... | 174/48 |
| 5,425,052 A * | 6/1995 | Webster et al. | ............. | 375/224 |
| 5,593,317 A * | 1/1997 | Humbles | ..................... | 439/502 |
| 5,729,824 A * | 3/1998 | O'Neill et al. | ............... | 725/106 |
| 5,857,861 A * | 1/1999 | Silliman | ..................... | 439/171 |
| 5,975,962 A * | 11/1999 | Laukonis | .................... | 439/713 |
| 6,031,300 A * | 2/2000 | Moran | ......................... | 307/119 |
| 6,056,584 A * | 5/2000 | Daoud | ......................... | 439/403 |
| 6,200,395 B1 * | 3/2001 | DeArdo et al. | ............. | 148/332 |
| 6,240,178 B1 * | 5/2001 | Pett et al. | ................... | 379/398 |
| 6,314,181 B1 * | 11/2001 | Pett | ............................. | 379/398 |
| 6,537,106 B1 * | 3/2003 | Follingstad | ................. | 439/534 |
| 2001/0037391 A1* | 11/2001 | West et al. | ................. | 709/226 |
| 2002/0097792 A1* | 7/2002 | Lanier et al. | ................ | 375/222 |
| 2003/0007605 A1* | 1/2003 | Rosen et al. | ................ | 379/1.04 |

\* cited by examiner

*Primary Examiner*—Duc Nguyen
*Assistant Examiner*—Tuan Pham
(74) *Attorney, Agent, or Firm*—Leonard C. Suchyta, Esq.

(57) ABSTRACT

Methods and apparatus for protecting quality of service during a process involving bridge tap in a communications system are described. Bridge tap may occur during system construction, central office re-concentration, replacement projects, upgrade projects, expansion projects, and installation of back-up cables, etc. Cables, with one end connected to a point in the system, and the other end left unterminated, result in bridge tap. In the bridge tap moderator of the present invention, a plurality of termination networks are attached to a modular connector such that a separate termination load is placed across each connector terminal pair for each corresponding wire pair of the cable. Communication lines can be easily attached to the moderator thereby easily, quickly, and efficiently eliminating bridge tap on a large number of wire pairs. The bridge tap modulator apparatus and method of use also minimize the amount of time bridge tap exists during cable and/or communication device installation. The use of bridge tap moderator results in improved overall system performance reflected in an improvement in attainable sync rate and increase in allowable loop length.

9 Claims, 6 Drawing Sheets

METHODS AND APPARATUS FOR A BRIDGE TAP MODERATOR

RELATED APPLICATIONS

The present application claims the benefit of U.S. Provisional Application Ser. No. 60/346,450 filed Jan. 7, 2002 now abandoned which is hereby expressly incorporated by reference.

FIELD OF THE INVENTION

The present invention is directed to communication networks, and more particularly, to methods and apparatus for protecting the quality of service during a process involving a bridge tap.

BACKGROUND OF THE INVENTION

Cable construction and central office re-concentration or replacement projects often require half-tapped or double-tapped placement of wire or cabling to facilitate the conversion or construction process. As part of the process of installing new cables and/or equipment, bridge taps often occur. A bridge tap is a length of wire or cable attached to normal endpoints of a circuit that introduces unwanted impedance imbalances that can interfere with data transmission.

In some instances, cables may be placed weeks or months in advance of the actual conversion or cable use. When pre-run, the cable ends are often laid in place, with one end of the new cable being connected to an existing cable and the other end left unterminated resulting in a bridge tap.

Bridge tap causes a wire to reflect signals from the unterminated end back to the source. Data signals, e.g., DSL signals, operate at high frequencies and can be severely impacted by the presence of bridge tap reflections. Circuits may operate at lowered speeds or data rates as a result of the bridge tap interference. Marginal circuits could exceed the operational limits of a design, thus entirely preventing the circuit from operating.

Accordingly, bridge taps can cause problems in operating systems. As the quality of service and attainable data rates degrade due to bridge taps, the supplier may be forced to move a customer to a lower service tier or deny services to a customer. The customer may be unsatisfied because the system no longer meets his needs. In addition, the overall system capacity loss experienced due to the bridge taps, the moving of a customer to a lower service tier, or the denial of services to a customer, may result in financial losses for both the communications service provider and the customer.

Given the negative effects of bridge tap, there exists a need for mitigating the effects of bridge tap. There is also a need for methods and apparatus for minimizing the amount of time bridge tap exists during cable and/or communications device installation which may occur during, e.g., system construction, central office re-concentration, replacement projects, upgrade projects, expansion projects, and installation of back-up cables/systems to provide reserve capacity or redundancy. At least some new methods of reducing the effects of bridge tap should be suitable for use with cables which include a large number of wires commonly used in many modern applications.

SUMMARY OF THE INVENTION

Methods and apparatus of the present invention can be used to mitigate the effects of bridge tap and the duration of bridge tap.

The present invention provides an apparatus, a bridge tap moderator, having a separate termination impedance for each one of, e.g., a plurality of wires to be terminated as part of a cable or communication installation. Pairs of wires forming a communication loop are terminated using a separate impedance network placed across each pair of wires used to form a communications loop. The impedance used to terminate each pair of wires can be matched to the type of circuitry to be protected and/or the length of wire ending in a bridge tap. To form the bridge tap moderator, a plurality of impedance circuits are mounted on a single connector, one for each utilized pair of connector terminals. The plurality of impedance circuits may each have the same impedance or, in some embodiments, circuits with different impedances are mounted on the same connector so that different pairs of wires are terminated with different impedances.

In various embodiments the connector is any one of a plurality of different standard connectors, e.g., standard connectors with multiple terminals to which wires of a cable can be attached or coupled, e.g., to a first side and to which termination networks can be attached to a second side.

The termination of each wire pair provided by the bridge tap moderator of the invention works to absorb and reduce the reflection of signals back into each of the wire loops connected to the moderator, resulting in improved quality of service for the cable and/or lines to which the moderator is connected.

In one embodiment, the multi-terminal connector is part of a punchdown block which has mounted with it a separate impedance network across each pair of connector terminals. Such an arrangement provides for quick wire connections/disconnections and bridge tap moderator portability. The ability to quickly connect and disconnect wires helps minimize the time period where bridge tap is introduced in the system during testing, connection and disconnection operations.

The method of the present invention for utilizing the bridge tap moderator provides an economical and efficient means to mitigate the effects of bridge tap even in cases where cables include large numbers of wire pairs to be terminated.

Additional features, benefits and details of the methods and apparatus of the present invention are described in the detailed description that follows.

DETAILED DESCRIPTION

Figure 1:
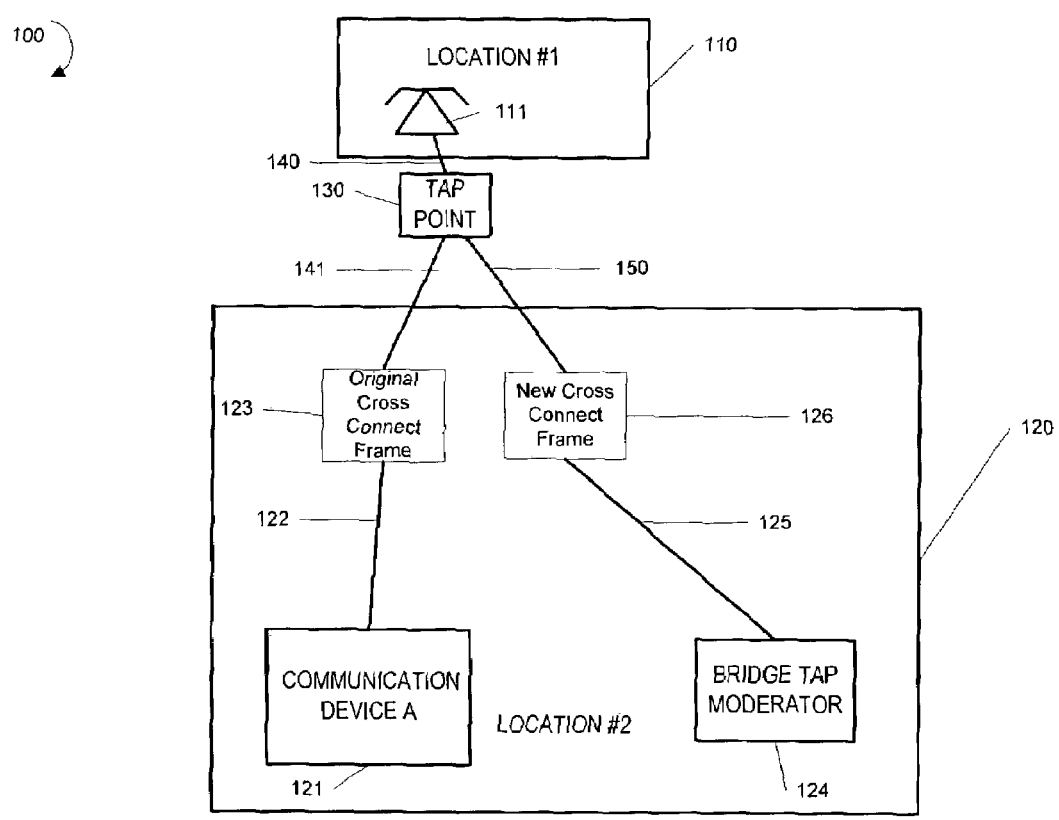
FIG. 1 illustrates an exemplary communications system in accordance with the present invention.

FIG. 1 illustrates an exemplary communications system 100 in accordance with the present invention. The exemplary system 100 includes a first location 110, for example, a customer premise, a second location 120, for example, a telephone central office, and a tap point 130. The tap point 130 represents a point where an original cable, comprising cable portions A 140 and A' 141, old cross connect frame A 123 and central office cable A 122 has been tapped to connect to a new cable B 150 which, ultimately, will terminate at the communications device A 121. As a result of the tap at tap point 130, the original cable has been divided into two sections A 140 and A' 141. Cable A 140 includes multiple pairs of wires, e.g., dozens in some cases. Individual conductors, wires, in cable A 140 are coupled at tap point 130 to corresponding individual wires in cable A' 141 and cable B 150.

The first location 110 includes a communication device 111, such as, for example, a Digital Subscriber Line (DSL) modem. The second location 120 includes an communication device A 121, for example, a Digital Subscriber Line Access Multiplexer (DSLAM), an original central office cable A 122, and an original cross connect frame A 123, which provides a connection point for cables A 122 and A 141. The second location 120 also includes a bridge tap moderator A 124 implemented in accordance with the invention, a new central office cable A 125, and a new cross connect frame A 126 which provides a connection point for cables A 125 and A 150. Thus in the exemplary system original cable segment 140 is coupled to communication device A 121 by Tap Point 130, cable segment 141, original frame 123, and cable segment 122. The bridge tap moderator 124 is also coupled to original segment 140, and thus also cable 141, by Tap Point 130, new cable 150, new cross connect frame 126 and cable 125.

The first communication device 111 is coupled to tap point 130 by the first segment A 140 of the original cable. The second segment A' 141 of the original cable couples communication device 121 to tap point 130 through cable A 122 and cross connect point A 123 and thus to the first communication device 111 which is also coupled thereto. The bridge tap moderator 124 is used in accordance with the invention to terminate new cable B 150 through cross connect B 126 and central office cable B 125 until it is connected to communications device 121. The bridge tap moderator 124 may be coupled to the new central office cable B 125 by a punch down block to which the wires of new cable B 125 are connected at the second location.

The DSLAM 121 is rate adaptive, meaning it will attempt to sync with the modem 111 at the maximum speed allowed. The maximum allowable speed is determined by, e.g., line conditions as determined by signal to noise measurements subject to various constraints. Such constraints include, for example, a customer selected subscription rate, service tier, and other factors. Line conditions include such things as distance between the DSLAM and modem, line noise, signal reflections on a line, etc. A significant factor in lowering service rate is near end bridge tap, i.e., a bridge tap near, e.g., at or within 300 feet of, the DSLAM or modem. The effect of a short bridge tap near the DSLAM tends to be highly detrimental to a DSL signal.

In accordance with the present invention, the bridge tap moderator 124 is used to terminate the bridge tap with an appropriate load. In various embodiments the bridge tap moderator 124 is implemented as a passive device that electrically terminates open-ended wires. Each bridge tap moderator 124 includes circuitry, e.g., resistors, capacitors and/or inductors, for moderating the effects of bridge tap.

Figure 2:
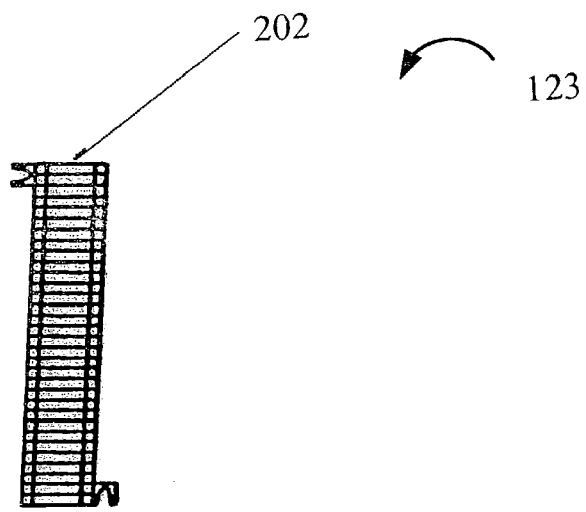
FIG. 2 illustrates a bridge tap moderator implemented using a punch down block.

The bridge tap moderator 124 may be a block mountable device such as a punch down block incorporating terminating networks or a plate mounted connector to which terminating networks are connected. FIG. 2 illustrates a bridge tap moderator 124 implemented using a punch down block 202 which is visible from the front perspective of FIG. 2. The block 202 provides a standard twenty-five pair Category 3 cable interface. In one exemplary embodiment of the invention, the bridge tap moderator terminating networks, 25 in the FIG. 2 embodiment, are mounted within the interior of the punch-down block 202.

Figure 3:
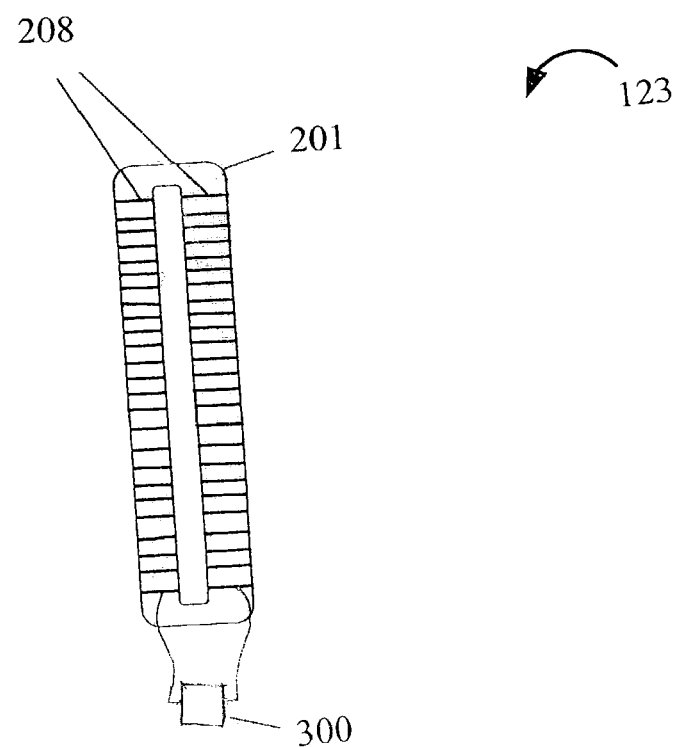
FIG. 3 shows a blown up rear view of an exemplary bridge tap moderator in accordance with the present invention with a single terminator network shown for purposes of explaining the invention.

FIG. 3 shows a blown up rear view of the bridge tap moderator 124. The exemplary bridge tap moderator 124 includes a connector assembly 201 which is part of the punch down block 202. FIG. 3 is intended to be descriptive in nature with the actual rear view of block 202 appearing somewhat different but with 25 pairs of terminals 208 being present. The moderator 124 includes plurality of incorporated wire terminal pairs 208, and a terminator network 300 for each wire terminal pair 208. For purposes of illustration, FIG. 3 shows a single terminator network 300 but it is to be understood that the bridge tap moderator normally includes one such network for each of the 25 wire pairs 208. Thus, a single bridge tap moderator 124 can be used to service 25 pairs of wires, i.e., 25 bridge taps. In various other embodiments, the type of connector 201 and number of wire terminal pairs 208 per connector 201 on the bridge tap moderator 124 of the present invention vary according to the particular application and/or number of tapped wire pairs.

The terminator network 300 on each wire terminal pair 208 may vary according to the requirements of the system, including the type of circuit being protected and the length of wire subjected to bridge tap.

In one embodiment of the present invention, the terminator networks 300 may be soldered to the wire terminal pairs 208 interface on the connector 201 of the bridge tap moderator 124.

Figure 4:
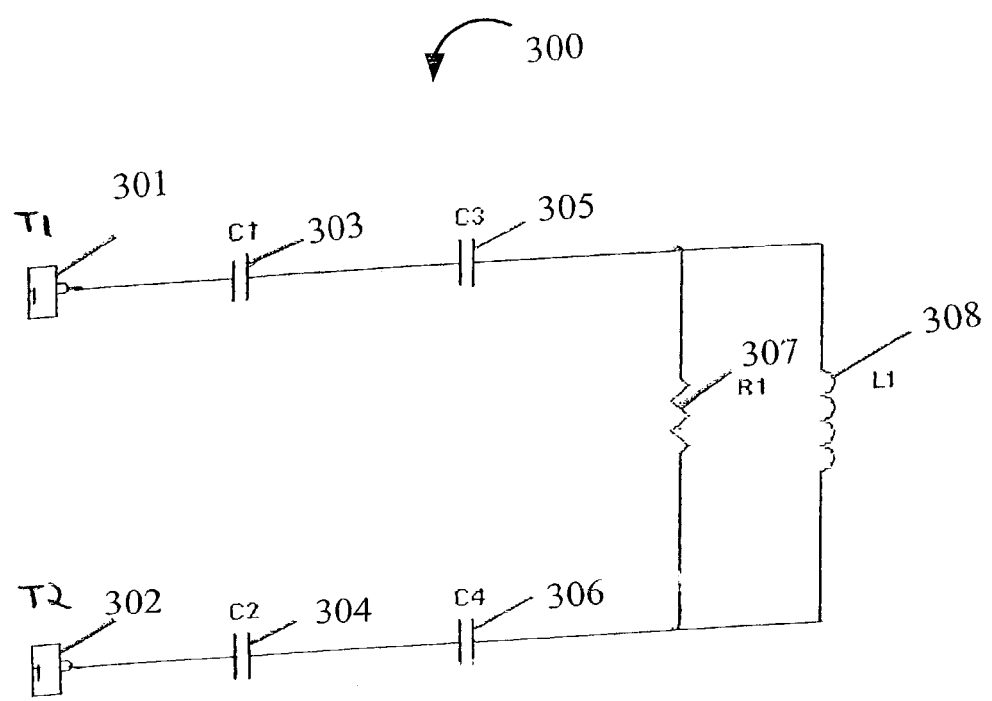
FIG. 4 illustrates a schematic view of an exemplary terminator network used on the exemplary bridge tap moderator in accordance with the present invention.

FIG. 4 shows a schematic diagram of an exemplary embodiment of a terminator network 300 suitable for use in the bridge tap moderator 124. Each terminator network 300 includes a first terminal (T1) 301, a second terminal (T2) 302, one or more capacitors C1 303, C2 304, C3 305, C4 306, a resistor R1 307, and an inductor L1 308. When placed across a connector terminal pair 208, the first terminal T1 301 will couple the network 300 to one side of a wire pair 208 while the second terminal T2 302 will couple the network 300 to the other side of the wire pair resulting in a load across the previously unterminated wire pair 208. The R, L and C components of the network 300 form a series loop between the first and second terminals, T1 301 and T2 302, as shown in FIG. 4. In the exemplary embodiment, the series loop comprises a plurality of capacitors 303, 304, 305, 306 arranged in series with the resistor R1 307 and indictor L1 308 which are arranged in parallel. It is to be understood that while a plurality of capacitors are shown, a single equivalent capacitor could be used in their place. Similarly, multiple resistors and/or inductors could be used in place of the individual resistor R1 307 and individual inductor L1 308, respectively. Network 300 serves as a termination at the end of a wire loop, for example one pair of wires in new (replacement) cable B 125 which is coupled at its other end to a corresponding pair of wires in the original cable at tap point 130.

In one exemplary embodiment of the present invention, the following values were chosen for the elements of the terminator network 300: C1 303=0.1 micro-farad, C2 304=0.1 micro-farad, C3 305=0.12 micro-farad, C4 306=0.12 micro-farad, R1 307=100 ohm, and L1 308=0.47 milli Henries.

Figure 5:
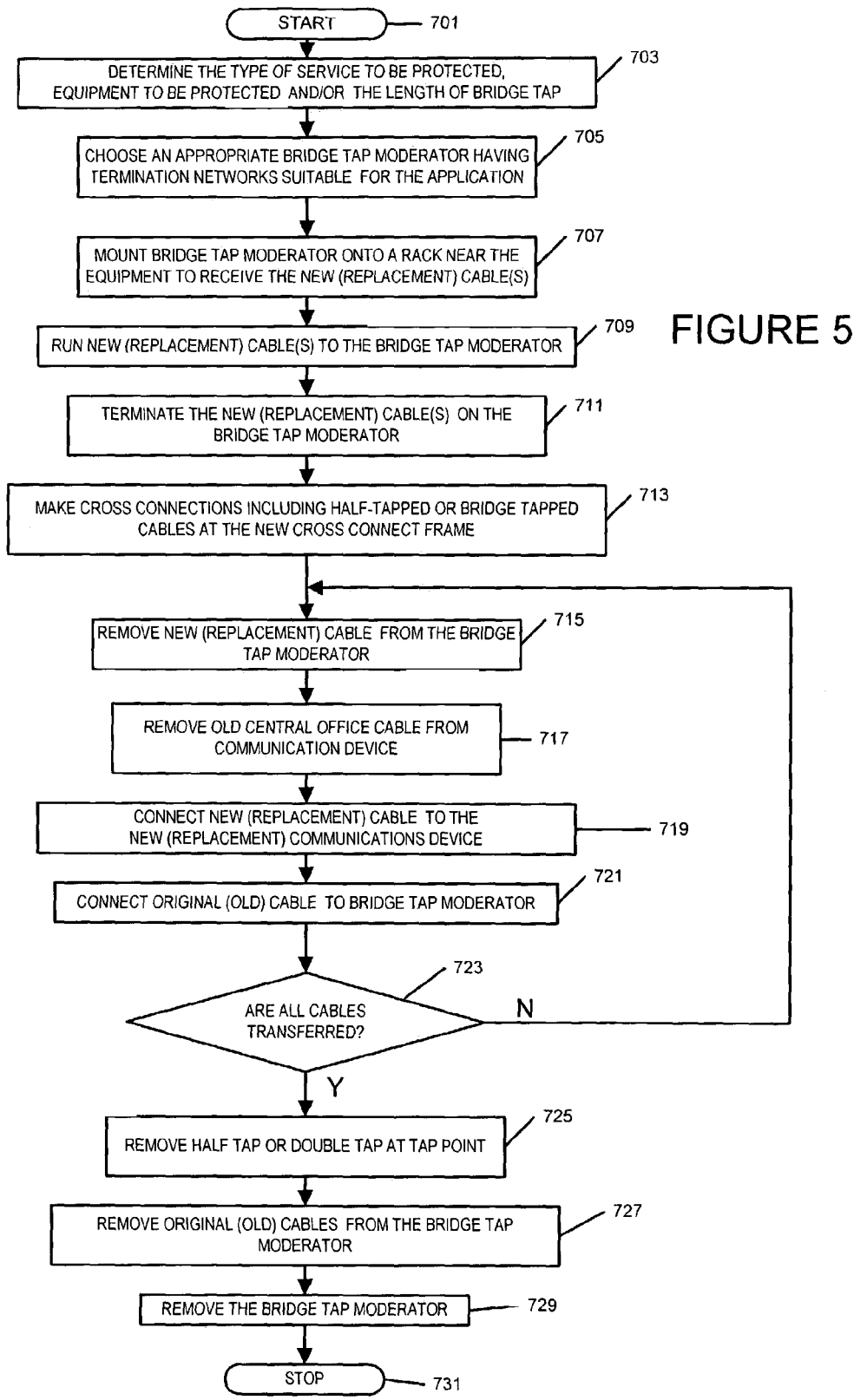
FIG. 5 illustrates an exemplary method for utilizing the bridge tap moderator in accordance with the present invention.

FIG. 5 illustrates an exemplary method for utilizing the bridge tap moderator 124 in accordance with the present invention. The process starts at START node 701 with the first operation occurring in step 703. In step 703 a determination is made as to the type of service to be protected, for example, DSL, the type of circuitry equipment to be protected, and/or the length of the bridge tap to be terminated. In the next step, step 705, an appropriate bridge tap moderator 124 having termination networks 300 suitable for the particular application are selected, e.g., based on the information determined in step 703. The bridge tap moderator 124 may be custom built for the specific application. Alternatively, in common situations such as bridge taps associated with DSL services, a bridge tap moderator 124 may be selected as a best fit from a set of pre-built re-usable bridge tap moderators 124 based on the characteristics determined in step 703. The pre-built bridge tap moderators 124 may be designed to correspond to different bridge tap lengths and connector types providing a wide range of different moderators 124 from which a selection may be made for various applications. Thus, in some cases, step 705 involves selecting a bridge tap moderator 124 having a plurality of preinstalled networks 300 from a variety of moderators at least some of which have different network component values and thus different termination loads.

Proceeding to step 707, the selected bridge tap moderator 124 is mounted on a rack near the communication device 121 to receive the new (replacement) cable B 125. Next, in step 709, a new (replacement) cable B 125 is run to the new cross connect frame B 126. In the following step, step 711, the new (replacement) cable B 125 is terminated on the bridge tap moderator 124.

After attachment of cable B 125 to the bridge tap moderator 124, and any optional testing, in step 713, cross connections are made to new cross connect frame B 126 and cable B 150 thereby coupling cable 150 to the bridge tap moderator 124.

When the system is ready to begin conversion to the new equipment/cable, the method resumes and proceeds with step 715. In step 715, the new (replacement) cable B 125 is removed from the bridge tap moderator 124. At this point, unterminated bridge tap is introduced into the system. Following removal of the cable from the moderator 124, operation rapidly proceeds to step 717 where the old cable A 122 is removed from the communication device 121. In step 719, the new cable B 125 is connected to the communications device 121. The process should proceed as rapidly as possible to step 721. In step 721, the original cable A' 122 is connected to the bridge tap moderator 124. This involves inserting the wire of original cable A' 122 into the connectors of bridge tap moderator 124 to which the new (replacement) cable B 125 wires had previously been connected. This eliminates the unterminated bridge tap in the system. In the following step 723, a decision is made as to whether all cables involved in the system conversion process have been transferred. If another cable is required to be transferred, flow is directed back to step 715. If all the cables in the conversion process have been transferred, flow proceeds forward to step 725, where the half tap or double tap is removed at the tap point 130. Now, the original (old) cables A' 122 no longer create a bridge tap condition. Next, in step 727, the original (old) cables A' 122 are removed from the bridge tap moderator 124.

Finally, in step 729, the bridge tap moderator 124 is removed form the punch down block 202 to which cable segment A' 122 was connected. The process stops with step 731 at which point the removed bridge tap moderator may be stored for use on another project.

Computer testing was done to predict the effect of the use of the bridge tap moderator 124 of the present invention in a simulated DSL system where a DSL modem was connected to a DSLAM by a cable which was to be tapped. For simulation purposes, a loop distance factor based on 100 foot increments was used to predict the effect for loop lengths between 6,500 feet and 15,000 feet in the case of a bridge tap from a 300 foot length of cable with the tap point located near the DSLAM.

For purposes of the test, the DSL subscription rate was set to 7168 Kbps. In ideal conditions the DSL modem would always sync with the DSLAM at 7168 Kbps. However, as discussed above other factors including loop distance and interference due to near end bridge can interfere with signals making it difficult or impossible to obtain this maximum rate. The graphs illustrated in FIGS. 6–8 were obtained through simulated tests and depict the difference in sync rate that may be obtained with a 300 foot bridge tap with and without use of the bridge tap moderator of the present invention.

Figure 6:
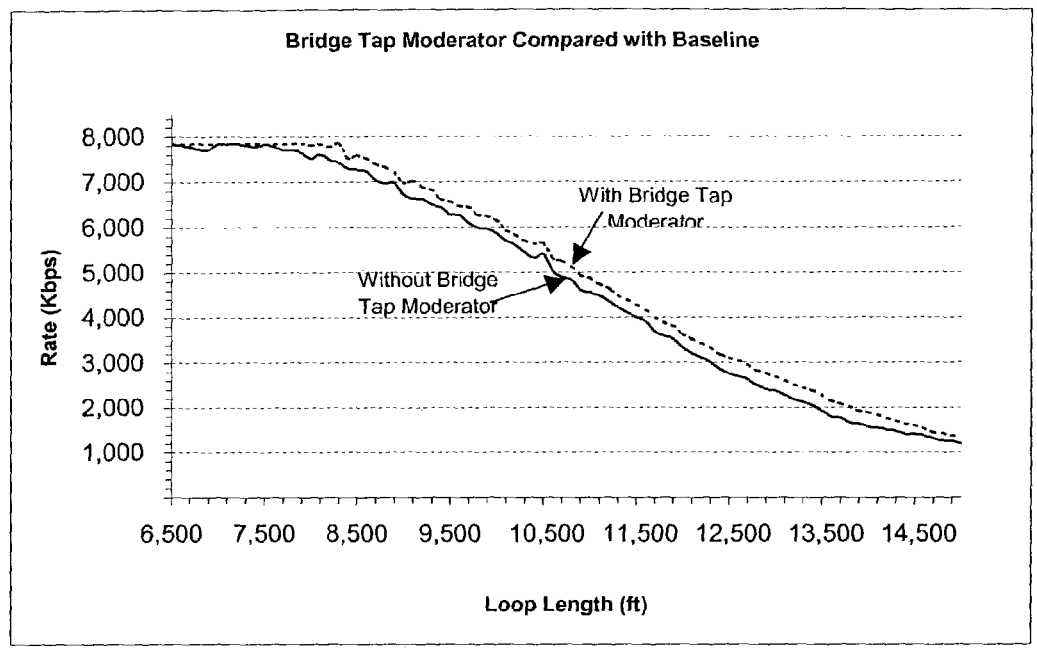
FIGS. 6–8 illustrate various test results relating to the use of an exemplary bridge tap moderator of the invention.
Figure 7:
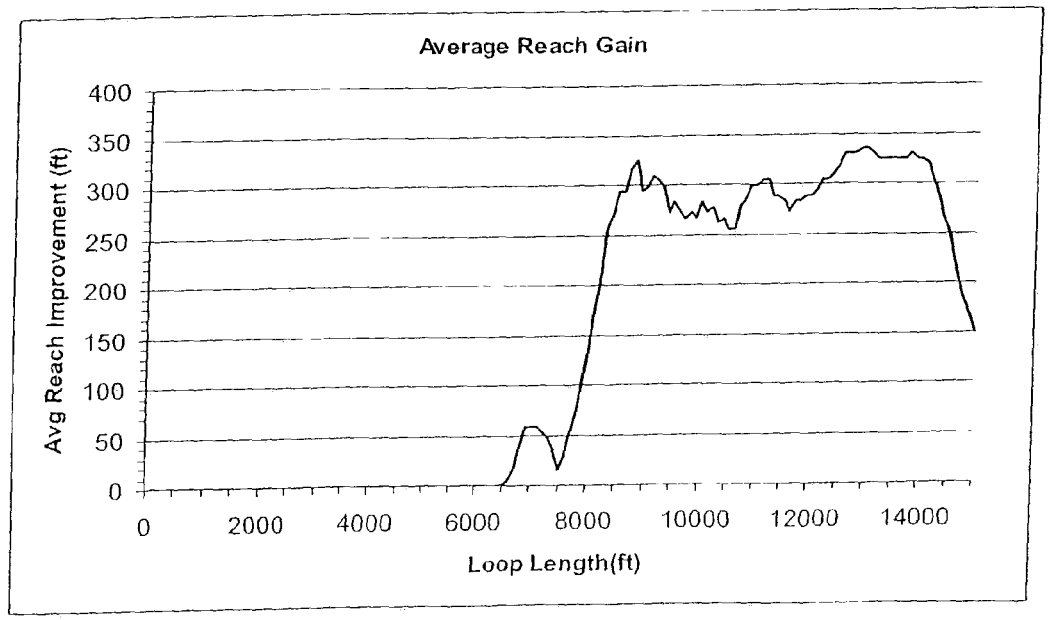

FIG. 6 is a graph displaying sync rate with and without the bridge tap moderator 124 present. FIG. 7 illustrates the average reach gain in the simulated system achieved using the bridge tap moderator 124 while FIG. 8 illustrates the average gain in terms of rate for the same simulated system.

Figure 8:
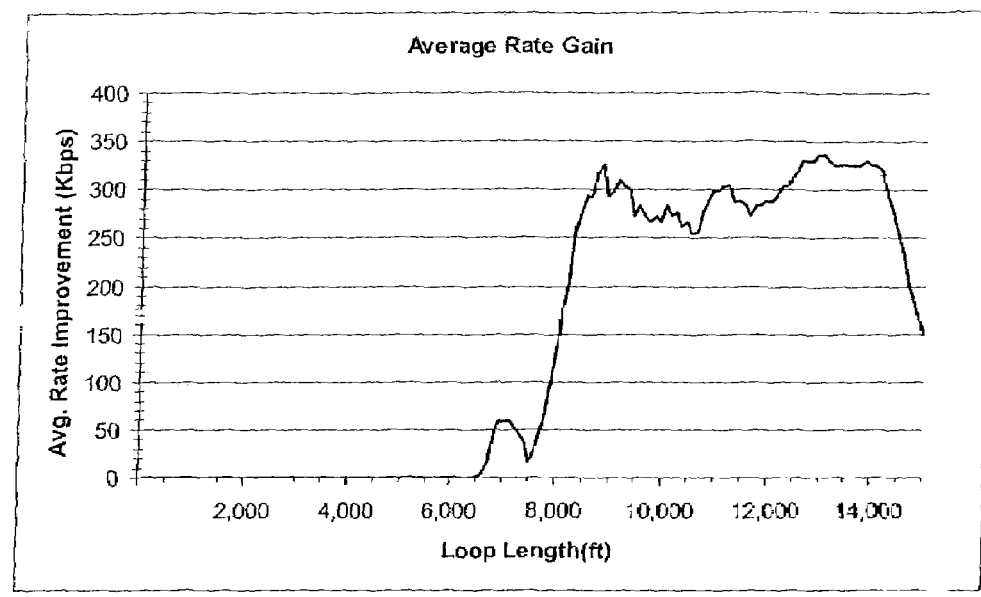

From the FIG. 6 through FIG. 8 charts, it can clearly be seen that use of the bridge tap moderator 124 can be beneficial to DSL system performance as compared to the case where bridge tap is left unmoderated.

It is to be understood that numerous variations on the above described methods and apparatus are possible without departing from the scope of the invention.

The invention claimed is:

1. A method of installing a first cable in a communications system, said first cable being a central office cable and including a plurality of different cable wire pairs, the method comprising:
    coupling a first end of a first cable including a plurality of different cable wire pairs to a bridge tap moderator including a plurality of electrically isolated termination networks, a different one of said electrically isolated termination networks being mounted across each of a plurality of pairs of bridge tap moderator terminals;
    coupling at a tap point a second end of the first cable to a second end of a second cable;
    disconnecting a first end of the second cable from a communications device to which it was coupled at the time said step of coupling a second end of the first cable to a second end of a second cable was performed;
    disconnecting the first end of the first cable from the bridge tap moderator;
    coupling the first end of the second cable including a plurality of different cable wire pairs to said bridge tap moderator;
    coupling the first end of the first cable to a communications device;
    disconnecting the second end of the second cable from said first cable; and
    disconnecting the first end of the second cable from said bridge tap moderator after disconnecting the second end of the second cable from said first cable.

2. The method of claim 1, further comprising:
selecting said bridge tap moderator from a plurality of different bridge tap moderators, at least some of the different bridge tap moderators including electrically isolated termination networks which are different from others of said bridge tap moderators.

3. The method of claim 2, further comprising:
determining the length of the first cable; and
wherein selecting said bridge tap moderator is performed as a function of the determined length.

4. The method of claim 2, further comprising:
determining the type of communications device coupled to the second cable; and
wherein selecting said bridge tap moderator is performed as a function of the determined type of communications device.

5. The method of claim 2, further comprising:
mounting the selected bridge tap moderator in an equipment rack prior to attaching said first end of the first cable.

6. The method of claim 5, further comprising:
removing said selected bridge tap moderator from said equipment rack after disconnecting the first end of the second cable from said bridge tap moderator.

7. The method of claim 1, wherein attaching a first end of a first cable to a bridge tap moderator includes coupling each of a plurality of wire pairs in said first cable to a different one of a corresponding plurality of pairs of bridge tap moderator terminals.

8. The method of claim 1, wherein said bridge tap moderator is a punch down block which includes said plurality of electrically isolated terminating networks inside said punch down block.

9. The method of claim 1, wherein said bridge tap moderator is a plate mounted connector assembly including a plate mounted connector on which said pairs of bridge tap moderator terminals are mounted, said plurality of electrically isolated termination networks being soldered across the pairs of bridge tap moderator terminals.

* * * * *